United States Patent [19]
Kagechika

[11] Patent Number: 5,185,621
[45] Date of Patent: Feb. 9, 1993

[54] CHARGING DEVICE FOR CAMERA
[75] Inventor: Takashi Kagechika, Omiya, Japan
[73] Assignee: Fuji Photo Optical Co., Ltd., Japan
[21] Appl. No.: 692,723
[22] Filed: Apr. 29, 1991
[30] Foreign Application Priority Data
  May 2, 1990 [JP] Japan ................................ 2-116323
[51] Int. Cl.⁵ .................................................. G03B 9/62
[52] U.S. Cl. ................................. 354/234.1; 354/251; 354/457
[58] Field of Search .................. 354/457, 195.1, 234.1, 354/235.1, 251

[56] References Cited
U.S. PATENT DOCUMENTS
  4,664,493  5/1987  Takagi ............................. 354/226
  4,860,040  8/1989  Tamamura et al. ............. 354/170

Primary Examiner—Michael L. Gellner

[57] ABSTRACT

A charging device for cameras which is usable for a charging apparatus as a driving source for various operations within a camera.

The charging device has a linear actuator of a shape memory alloy which extends and contract by the shape restoring action thereof, and a current supplier for applying a predetermined current to the actuator of a shape memory alloy for heating it. The extending and contracting operation of the actuator of a shape memory alloy is utilized for charging a shutter charging apparatus, charging and releasing a shutter charging apparatus or charging the driving force for a focusing lens. The charging device can simplify the structure of various charging apparatuses, reduce the weight thereof and realize a silent-operation camera.

4 Claims, 4 Drawing Sheets (a)

CHARGING DEVICE FOR CAMERA

BACKGROUND OF THE INVENTION

1. Field of the Invention

The present invention relates to a charging device for cameras and, more particularly, to a charging device for cameras which is used for a charging apparatus usable as a driving source for various operations within a camera and which executes the charging operation by means of an actuator made of a shape memory alloy.

2. Description of the Prior Art

Various charging apparatuses for driving a shutter, a lens barrel and the like are provided within a camera. For example, a charging apparatus for a shutter is charged with a spring urging force, which is a driving force for the shutter, by a driving force from a DC motor or the like which is used for the purpose of feeding a film in coupling with the film taking-up operation.

FIGS. 4(a) and 4(b) show a conventional spring urging force charging apparatus of a program shutter for adjusting exposure by, for example, two blades provided on the back side of the shutter portion. In FIG. 4a, when the film is taken up after photographing is finished, for example, a sliding plate 10 is pressed by a cam or the like in the direction indicated by the arrow 100 so as to slide on a shutter plate 2. At the point where a driving lever 8 is engaged with a shutter lever 6, a catch 13 is locked in an engaging groove 10a. At this time, the driving force of the shutter is charged by a driving spring 12.

When a shutter release button is pressed, an electromagnet 16 is turned on, thereby holding a closing lever 14. Since the catch 13 is released when the shutter release button is pressed, the sliding plate 10 slides downward. As a result, the driving lever 8 presses down the shutter lever 6 (pushes up a pin 6a) and opens shutter blades 1a, 1b. As shown in FIG. 4b, the two shutter blades 1a and 1b rotate around pins 4a and 4b, respectively, of a presser plate 3 as their axes so as to open a shutter aperture 2a.

At this time, a light quantity sensor (not shown) detects the exposure and when the exposure reaches a predetermined value, the electromagnet 16 is turned off, so that the closing lever 14 which is out of contact with the electromagnet 16 rotates by virtue of the urging force of a spring 15, and a closing pin 14a presses a cam portion 8b of the driving lever 8, thereby releasing the engagement between a holding claw 8a and a projection 6c. The two shutter blades 1a, 1b are closed by virtue of the urging force of a spring 7, thereby finishing the shuttering operation.

In the conventional charging apparatus shown in FIG. 4, however, the driving force of the DC motor for taking up a film is transmitted to the sliding plate through a gear train, a cam and the like, and the spring force is charged by the sliding operation of the sliding plate. The charging apparatus is therefore complicated and requires a considerable space. Thus, a conventional charging apparatus is a barrier to the reduction in weight and size of a camera.

In addition, since the release of the charging apparatus is carried out by the operation of the electromagnet 16 and the catch 13 which is started by the operation of pressing down the release button, the apparatus is complicated. Furthermore, since the operation of the electromagnet 16 produces a sound, quiet operation is impossible.

In photographing, it is often required to take a picture of an animal in the natural world, a child or the like in the natural state thereof. It is therefore expected to produce a silent-operation camera which enables photographing free from a sound produced by an operation such as shuttering.

SUMMARY OF THE INVENTION

Accordingly, it is an object of the present invention to eliminate the above-described problems in the prior art and to provide a charging device for cameras which is capable of simplifying the charging apparatus provided within a camera and, hence, reducing the weight and the size of the camera, and which is capable of realizing the silent operation of a camera.

To achieve this aim, the present invention provides a charging device for cameras for charging a driving force for various operations in a camera, the charging device comprising: a linear actuator of a shape memory alloy which extends and contracts by the shape restoring action; and a current supplier for applying a predetermined current to the actuator of a shape memory alloy to heat the actuator; wherein the extending and contracting action of the actuator of a shape memory alloy both charges and releases the charging apparatus.

A charging device for cameras according to the present invention is applicable to a charging apparatus for charging the driving force for the shuttering operation and a charging apparatus for charging the driving force for a focusing lens.

According to the above-described apparatus, when a predetermined current is applied to the actuator of a shape memory alloy from the current supplier, the actuator is heated due to the electric resistance which the shape memory alloy has. When the temperature rises up to the transformation point, the shape is restored to the original shape which the shape memory alloy memorizes, so that the length of the actuator is reduced. It is therefore possible to extend or contract the actuator of a shape memory alloy by controlling the supply of a current of the current supplier. By the contracting force, the charging mechanism can charge, for example, a spring in the charging apparatus with a spring urging force.

The charging mechanism also has a releasing function based on the operation of the actuator of a shape memory alloy. By the releasing action of the charging mechanism, charged driving force is released, and if the charging device is used for a shutter apparatus, the driving force opens and closes the shutter.

The above and other objects, features and advantages of the present invention will become clear from the following description of the preferred embodiments thereof, taken in conjunction with the accompanying drawings.

BRIEF DESCRIPTION OF THE DRAWINGS

FIGS. 2(a) and 2(b) are enlarged views of an actuator of a shape memory alloy and a charging mechanism in the first embodiment shown in FIG. 1, wherein FIG. 2(a) shows the state before charging, and FIG. 2(b) shows the state of charging;

FIGS. 3(a) and 3(b) are enlarged views of a charging mechanism in a second embodiment of the present invention, wherein FIG. 3(a) shows the state before charging, and FIG. 3(b) shows the state of charging; and FIGS. 4(a) and 4(b) show the apparatus of a conventional shutter charging apparatus, wherein FIG. 4(a) shows the back side of a shutter plate.

DESCRIPTION OF THE PREFERRED EMBODIMENTS

Embodiments of the present invention will be described in detail with accompanying drawings.

First Embodiment

Figure 1:
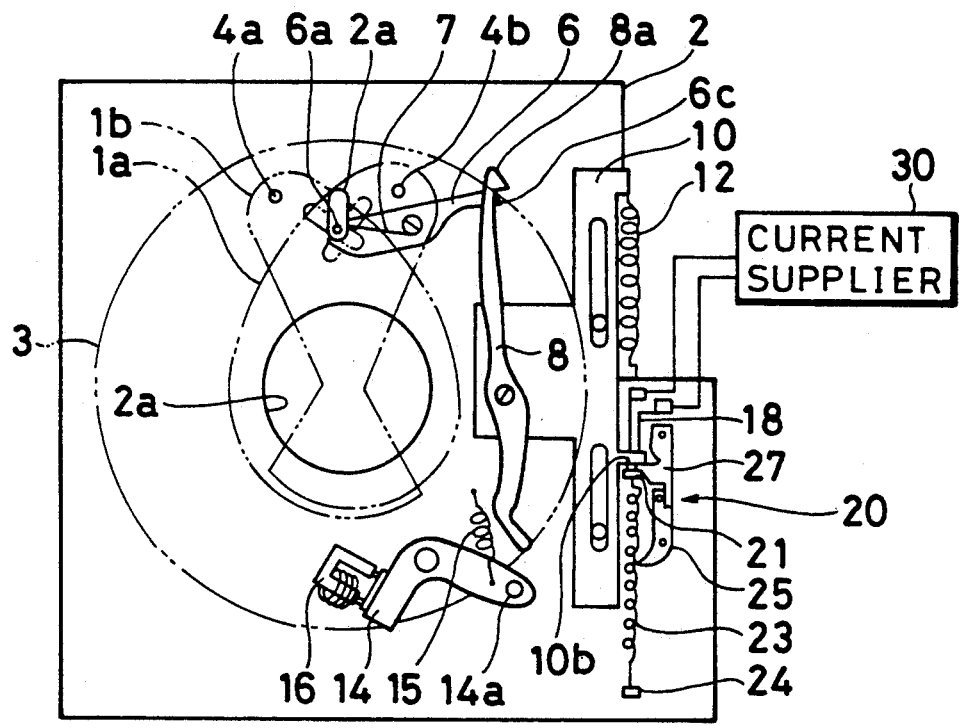
FIG. 1 shows the apparatus of a first embodiment of a charging device for cameras according to the present invention which is applied to a camera shutter.

FIG. 1 shows an embodiment of a charging device according to the present invention which is applied to the charging apparatus of a camera shutter, as viewed from the back side of the camera. In this embodiment, the charging device is applied to what is called a program shutter for adjusting the exposure like the conventional charging device shown in FIGS. 4(a) and 4(b).

Figure 4:
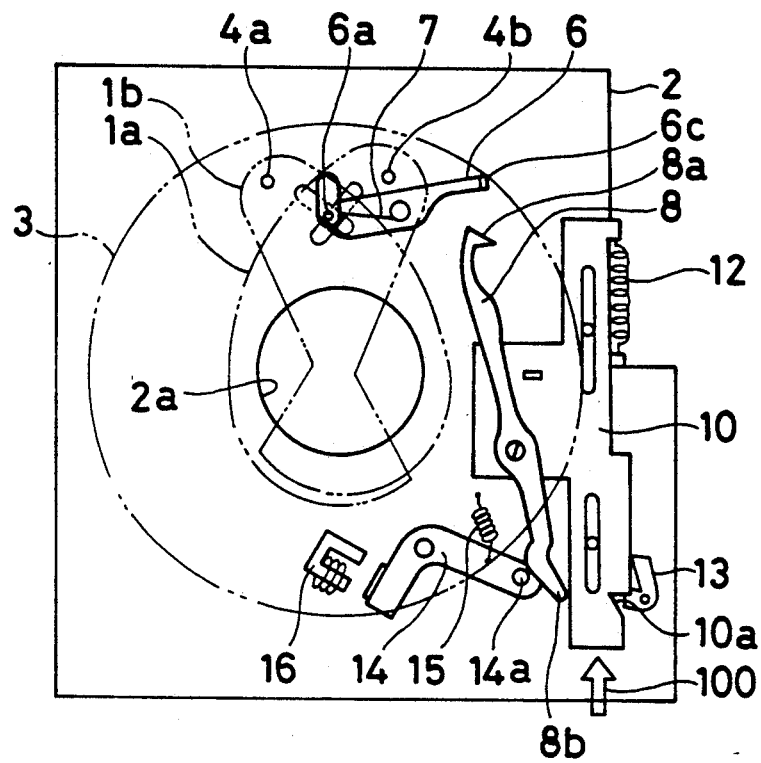
FIG. 4 (b) shows the portion of the presser plate on the front side of the shutter plate.
Figure 4:
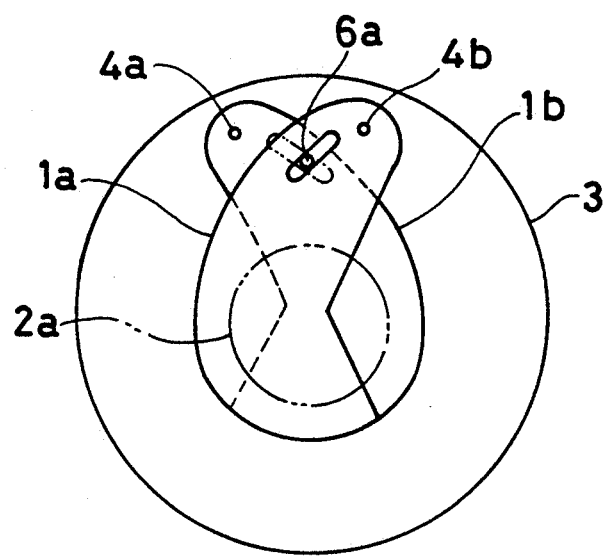

In FIG. 1, since the fundamental structure is the same as that of the device shown in FIG. 4, explanation thereof will be omitted.

In this embodiment, the sliding plate 10 for holding the driving lever 8 is provided with an engaging piece 10b and an actuator 18 of a shape memory alloy and a charging mechanism 20 for sliding the sliding plate 10 in engagement with the engaging piece 10b are provided on a shutter plate 2.

Figure 2:
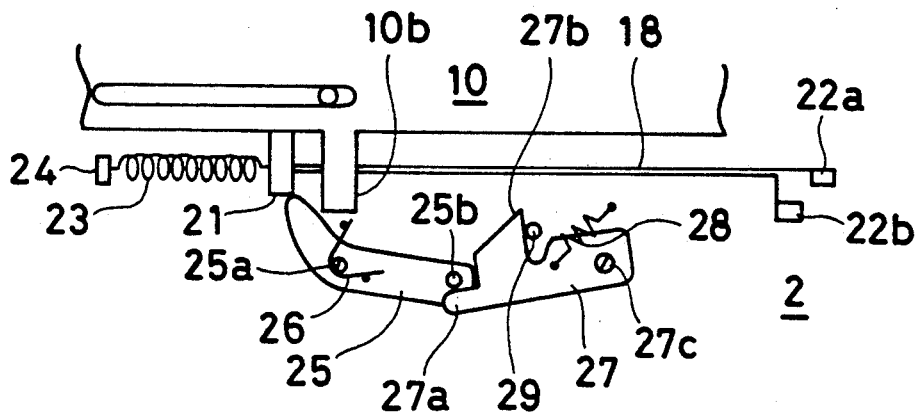
Figure 2:
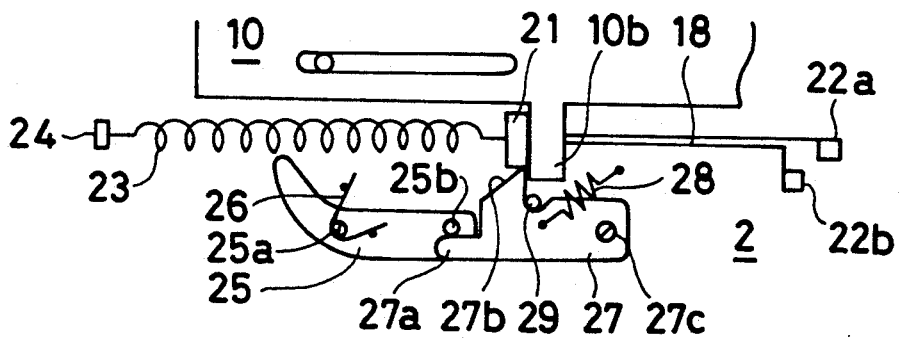

FIGS. 2(a) and 2(b) are enlarged views of the actuator 18 of a shape memory alloy and the charging mechanism 20. The linear actuator 18 of a shape memory alloy is disposed along a longitudinal side in such a manner as to be doubled over. A driving member 21 for both charging and releasing operations is attached to the bent portion of the actuator 18 of a shape memory alloy, and terminals 22a, 22b are attached to both ends of the actuator 18. The driving member 21 is slidably guided along a guide groove, a rail or the like (not shown), and when the driving member 21 slides rightward in the drawings, the driving member 21 is engaged with the engaging piece 10b, thereby sliding the sliding plate 10.

A return spring 23 is attached to the driving member 21. The return spring 23 is fixed on the shutter plate 2 by a fixing member 24. Consequently, the driving member 21 moved by the actuator 18 of a shape memory alloy is restored to the original position by the return spring 23.

A release lever 25 is provided such that one end thereof comes into contact with and is pressed by the driving member 21 during the movement of the driving member 21. The release lever 25 rotates around a shaft 25a and it is urged in a clockwise direction by a two-legged spring 26. A pin 25b is provided at the other end of the release lever 25. A stop lever 27 having a projection 27a which engages the pin 25b is provided on the shutter plate 2. The stop lever 27 rotates around a shaft 27c and it is urged in a clockwise direction by a coil spring 28. The clockwise rotation of the stop lever 27 is regulated by a pin 29.

The stop lever 27 is provided with a retaining portion 27b for retaining the engaging piece 10b of the sliding plate 10. The retaining portion 27b is saw-toothed, as shown in FIG. 2(a), so that the engaging piece 10b which moves rightward can pass the stop lever 27 while pushing the engaging piece 10b.

A current supplier 30 is connected to the terminals 22a, 22b of the actuator 18 of a shape memory alloy, as shown in FIG. 1. A predetermined current is supplied to the actuator 18 of a shape memory alloy from the current supplier 30.

As a shape memory alloy for the actuator 18 is usable, for example, a Ti-Ni (titanium-nickel) unidirectional shape memory alloy such as Biometal fiber (trade name). The actuator 18 of a shape memory alloy in this embodiment has a diameter of about 150 μm. The actuator 18 of a shape memory alloy becomes soft at a low temperature and hard at a high temperature and has a sufficient mechanical strength for pulling the slide plate 10. In this embodiment, the return spring 23 applies an extending biasing force at a low temperature, as described above, so as to allow repetitive operations.

The current supplier 30 applies a current to the actuator 18 of a shape memory alloy to heat and contract the actuator 18. For example, a current of 120 mA is applied to the actuator 18 of a shape alloy memory at a voltage of about 1.2 V for several tenth seconds if the actuator 18 of a shape alloy memory has a diameter of about 150 μm and a length of about 10 cm.

According to this embodiment having the above-described structure, the shuttering operation and the releasing operation are carried out in the following manner.

In FIG. 1, when the film is taken up after photographing is finished, a predetermined current is supplied to the actuator 18 of a shape memory alloy from the current supplier 30. Several tenth seconds after, the temperature reaches the transformation point of the shape memory alloy and the shape of the actuator 18 of a shape memory alloy is restored to the memorized shape, whereby the length of the actuator 18 is shortened. Consequently, the driving member 21 moves rightward from the state shown in FIG. 2(a) and slides the sliding plate 10 in engagement with the engaging piece 10b. When the sliding plate 10 reaches a predetermined position, as shown in FIG. 2(b), the retaining portion 27b of the stop lever 27 retains the engaging piece 10b, thereby stopping the sliding plate 10.

At this time, the driving lever 8 shown in FIG. 1 engages the holding claw 8a with the projection 6c of the shutter lever 6, whereby the driving spring 12 is charged with the driving force for the shutter.

Since the supply of a current to the actuator 18 of a shape memory alloy is stopped after charging the driving spring 12, only the driving member 21 is restored to the original position by the return lever 23. At this time, the driving member 21 pushes one end of the release lever 25 to rotate it in a counterclockwise direction but does not operate the stop lever 27.

When the actuator 18 of a shape memory alloy is energized again by the operation of a shutter button (not shown) or the like, the driving member 21 moves rightward and pushes one end of the release lever 25 to rotate it in a clockwise direction, as shown in FIG. 2(a). As a result, the release lever 25 rotates the stop lever 27 in a counterclockwise direction and the retaining portion 27b is released from the engaging piece 10b. Thus, the driving lever 8 shown in FIG. 1 presses down the shutter lever 6 to open the two shutter blades 1a, 1b.

Simultaneously, the exposure is detected by a light quantity sensor provided on the front side, and when a predetermined exposure is detected, the electromagnet 16 is turned off. The closing lever 14, which comes out of contact with the electromagnet 16 when it is turned off, rotates, and the closing pin 14a pushes the cam portion 8a of the driving lever 8, so that the holding claw 8a is released from the projection 6c. In this way, the two shutter blades 1a, 12 are closed, whereby the shuttering operation is finished.

Second Embodiment

A second embodiment of the present invention will now be explained with reference to FIGS. 3(a) and 3(b). This embodiment has a different charging mechanism from that of the first embodiment.

Figure 3:
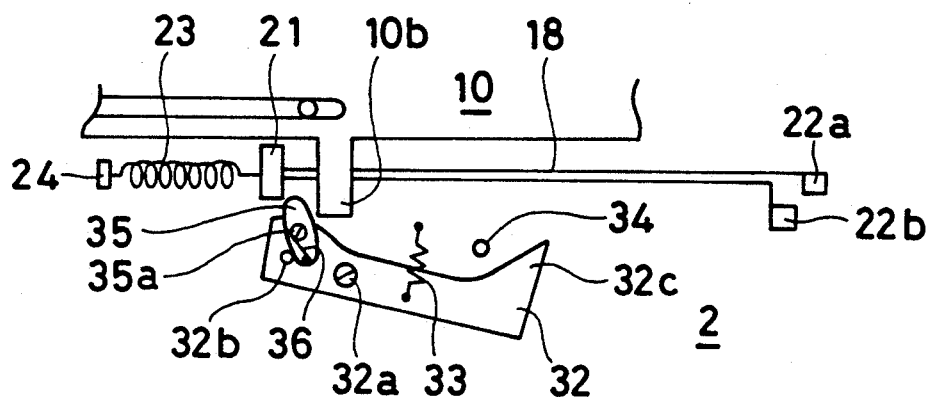
Figure 3:
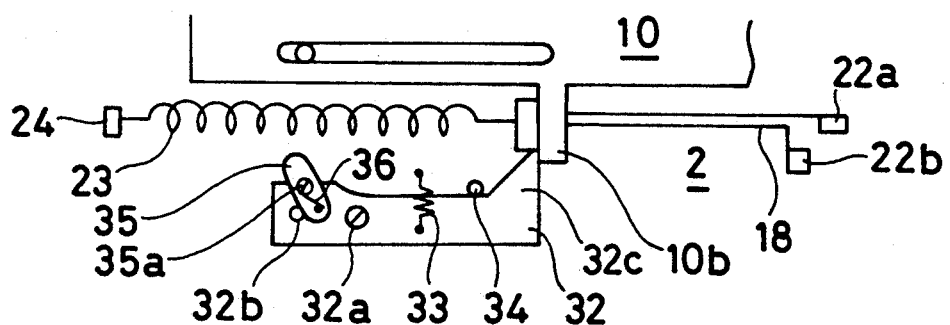

In FIGS. 3 (a) and 3(b), a first lever 32 is provided in such a manner as to rotate around a shaft 32a. A coil spring 33 urges the first lever 32 in a counterclockwise direction and stops the rotation by a pin 34. A pin 32b is provided at one end of the first lever 32 and a retaining portion 32c for retaining the engaging piece 10b is provided at the other end of the first lever 32 as in the first embodiment shown in FIGS. 2(a) and 2(b).

The first lever 32 is provided with a second lever 35 such that the clockwise rotation is regulated by the pin 32a, thereby constituting a double lever structure. The second lever 35 is provided with a single-legged spring 36 which urges the second lever 35 in a clockwise direction around a shaft 35a. In this way, when the driving member 21 moves rightward, the second lever 35 operates the pin 32b so as to rotate the first lever 32 in a clockwise direction. On the other hand, when the driving member 21 moves leftward, the second lever 35 only rotates in a counterclockwise direction without any operation of the first lever 32.

According to the second embodiment having the above-described structure, when the actuator of a shape memory alloy is energized, the driving member 21 moves, and the retaining portion 32c of the first lever 32 engages the engaging piece 10b, as shown in FIG. 3(b). The driving member 21 returns to the original position while pushing only the second lever 35. When the actuator 18 of a shape memory alloy is energized again, since the driving member 21 rotates the second lever 35 together with the first lever 32 in a clockwise direction, the retaining portion 32c is released from the engaging piece 10b.

"As described above, the first lever (32) functions as the stop lever for the sliding plate (10) and the second lever (35) functions as the release lever in the same way as in the first embodiment."

Although these embodiments are applied to a program shutter, the present invention is also applicable to a charging apparatus for a shutter which has a stop and shutter blades separately from each other (e.g., Japanese Patent Publication No. 32454/1972).

Although these embodiments are applied to the charging apparatus for a shutter of a camera, the present invention is also applicable to a charging apparatus of other driving system such as a charging apparatus of a focusing lens. In the case of applying the present invention to driving system for a focusing lens, the actuator of a shape memory alloy is adopted to rotate a rotating member provided around the lens barrel so as to move the lens barrel forward and backward.

As described above, according to a charging device for cameras according to the present invention, a linear actuator of a shape memory alloy is incorporated into a charging apparatus for various driving forces in a camera, and a predetermined current is applied to the actuator of a shape memory alloy so that the charging operation is carried out by the shape restoring action of the shape memory alloy. In addition, since the releasing operation is also carried out by the actuator of the shape memory alloy, it is possible to simplify the charging apparatus for various driving forces provided in a camera and to reduce the size and the weight of the camera.

Especially, in a second embodiment which is applied to the charging apparatus for a shutter, since a gear train and a cam member are dispensed with, the structure of the charging apparatus is simplified and the reduction in the size and the weight of a camera is realized.

In addition, since a shape memory alloy is used, various charging operations and releasing operations free from a sound produced by the operations is possible. Thus, it is possible to provide a silent-operation camera.

Furthermore, according to the present invention, it is possible to provide a charging device at a low cost.

While there has been described what are at present considered to be preferred embodiment of the invention, it will be understood that various modifications may be made thereto, and it is intended that the appended claims cover all such modifications as fall within the true spirit and scope of the invention.

What is claimed is:

1. A charging device for cameras comprising: a linear actuator for charging a shutter charging mechanism by a first extending and contracting operation thereof and releasing said shutter charging mechanism by a second extending and contracting operation thereof.

2. A charging device for cameras according to claim 1, wherein said shutter charging mechanism includes a driving lever and an urging member for applying a driving force to said driving lever, and said urging force of said urging member is charged by the contracting operation of said linear actuator.

3. A charging device for cameras according to claim 1, wherein a stop lever which retains a sliding plate for holding said driving lever, at a position at which the driving force for the shutter is charged is provided as a member for charging said shutter charging mechanism, while a release lever for releasing the retained state of said sliding plate in engagement with said stop lever is provided as a member for releasing said shutter charging mechanism, and in order to charge said shutter charging mechanism, said actuator causes said sliding plate to slide and said stop lever to retain said sliding plate at said predetermined position, while in order to release said shutter charging mechanism, said actuator operates said release lever so as to release the retained state of said stop lever.

4. A charging device for cameras according to claim 1, wherein said linear actuator is made of a shape memory alloy which extends and contracts by the shape restoring action, and a predetermined current is applied to said actuator of a shape memory alloy so as to extend or contract said actuator.

* * * * *